United States Patent
Johnson et al.

(10) Patent No.: US 10,338,885 B1
(45) Date of Patent: Jul. 2, 2019

(54) AURAL AND VISUAL FEEDBACK OF FINGER POSITIONS

(71) Applicant: Rockwell Collins, Inc., Cedar Rapids, IA (US)

(72) Inventors: Neil C. Johnson, Cedar Rapids, IA (US); Christopher R. Chapman, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/587,168

(22) Filed: May 4, 2017

(51) Int. Cl.
    *G06F 3/16*     (2006.01)
    *G06F 3/044*     (2006.01)
    *G06F 3/0481*     (2013.01)
    *B64D 43/00*     (2006.01)

(52) U.S. Cl.
    CPC .............. *G06F 3/167* (2013.01); *B64D 43/00* (2013.01); *G06F 3/044* (2013.01); *G06F 3/0481* (2013.01); *G06F 2203/04108* (2013.01)

(58) Field of Classification Search
    CPC ........ G09B 13/04; H01H 19/14; G05G 9/047; B06K 37/06; B06K 2350/1012; B06K 2350/102; B06K 2350/1047
    See application file for complete search history.

(56) References Cited

U.S. PATENT DOCUMENTS

| | | | | |
|---|---|---|---|---|
| 5,844,500 A | * | 12/1998 | Beuk .................. | B60R 16/0231 341/22 |
| 8,626,387 B1 | * | 1/2014 | Nagata ..................... | G06F 7/00 701/36 |
| 2007/0008293 A1 | * | 1/2007 | Oldrey ................ | G06F 3/04895 345/173 |
| 2007/0198141 A1 | * | 8/2007 | Moore ................... | B64D 43/00 701/3 |
| 2008/0300756 A1 | * | 12/2008 | Passaro ................. | B60K 35/00 701/49 |
| 2011/0205161 A1 | * | 8/2011 | Myers ..................... | G06F 3/016 345/169 |
| 2011/0240455 A1 | * | 10/2011 | Kulczycki ........... | G06F 3/03547 200/600 |
| 2013/0161172 A1 | * | 6/2013 | Leong ................ | H01H 13/7065 200/5 A |
| 2014/0132516 A1 | * | 5/2014 | Tsai ....................... | G06F 3/0202 345/168 |
| 2014/0138229 A1 | * | 5/2014 | Chen ....................... | H03K 17/98 200/5 A |
| 2015/0324007 A1 | * | 11/2015 | Lee ..................... | H03K 17/9629 345/170 |
| 2017/0170826 A1 | * | 6/2017 | Henty .................. | H03K 17/969 |

FOREIGN PATENT DOCUMENTS

WO      WO 2005065034 A2 *    7/2005              G09B 13/04

* cited by examiner

*Primary Examiner* — Dong Hui Liang
(74) *Attorney, Agent, or Firm* — Angel N. Gerdzhikov; Donna P. Suchy; Daniel M. Barbieri

(57) ABSTRACT

Methods and systems for providing aural and/or visual feedback of finger positions to help improve user friendliness and usability of control panels are disclosed. A control panel may include a control element, a sensor associated with the control element, and one or more processors in communication with the sensor. The sensor may be configured to detect a presence of a finger near the control element and generate a detection signal. The one or more processors may be configured to process the detection signal and provide a feedback indicating the presence of the finger near the control element to a user.

13 Claims, 7 Drawing Sheets

AURAL AND VISUAL FEEDBACK OF FINGER POSITIONS

BACKGROUND

With current implementations of avionics controls, pilots usually adjust their focus from a head up position to a head down position to acquire visual of the control panel and make adjustments and provide inputs. Further, in smaller (usually retrofit) flight-decks, some of the control panels (e.g., keyboards) are often placed in unideal locations (e.g., nearly on the floor or almost behind the pilot). Current implementations of avionics controls therefore lack user friendliness and may cause some usability issues.

SUMMARY

In one aspect, embodiments of the inventive concepts disclosed herein are directed to an apparatus. The apparatus may include a control element, a sensor associated with the control element, and one or more processors in communication with the sensor. The sensor may be configured to detect a presence of a finger near the control element and generate a detection signal. The one or more processors may be configured to process the detection signal and provide a feedback indicating the presence of the finger near the control element to a user.

In a further aspect, embodiments of the inventive concepts disclosed herein are directed to system. The system may include a control element, a sensor associated with the control element, and one or more processors in communication with the sensor. The sensor may be configured to detect a presence of a finger near the control element and generate a detection signal. The one or more processors may be configured to process the detection signal. The system may also include a display in communication with the one or more processors. The display may be configured to provide a visual feedback indicating the presence of the finger near the control element to a user in response to control of the one or more processors upon processing the detection signal.

In another aspect, embodiments of the inventive concepts disclosed herein are directed to a method. The method may include: detecting a presence of a finger near a control element; providing a detection signal to one or more processors in response to the presence of the finger near the control element; and providing a feedback to a user, facilitated by the one or more processors, to indicate the presence of the finger near the at least one control element.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
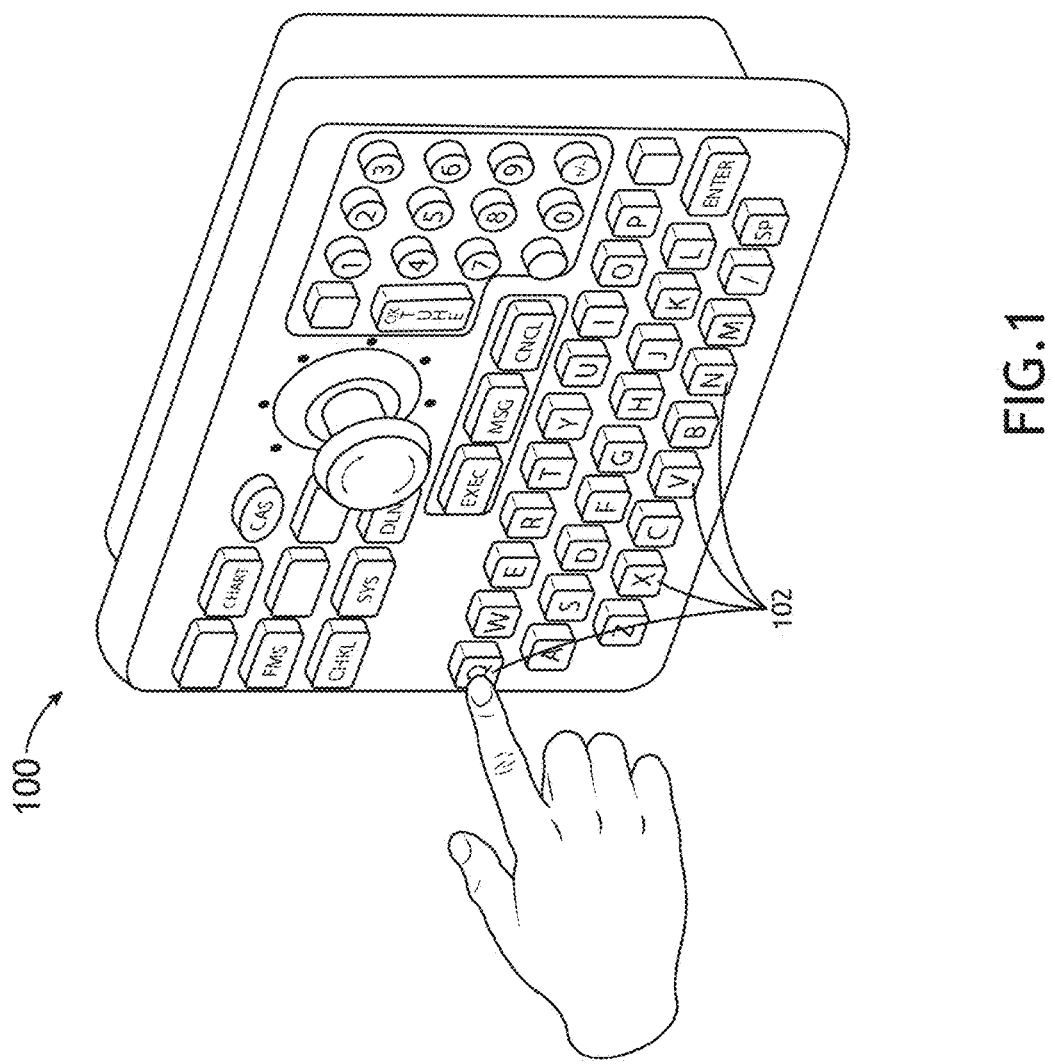
FIG. 1 is an illustration depicting an exemplary control panel configured to support an exemplary visual feedback configured according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to methods and systems for providing aural and/or visual feedback of finger positions to help improve user friendliness and usability of control panels (e.g., avionics control panels). In some embodiments, the control elements located on the control panels may be equipped with sensing devices configured to detect near-touches of the control elements. Upon a detection of a near-touch, the detection signal may be communicated to one or more processors configured to facilitate a display of a visual feedback (e.g., a graphical representation of the control panel) on a display device (e.g., a head up display, a flight display, or a head mounted display) visible to the user. The visual feedback may provide an indication to the user as to which control element the user's finger is the closest. Additionally and/or alternatively, an aural feedback containing similar information may also be provided to further assist the user.

Referring generally to FIGS. 1-4. FIG. 1 is an illustration depicting an exemplary control panel 100 configured to support exemplary visual feedbacks 104 (shown in FIGS. 2-4) in accordance with an embodiment of the inventive concepts disclosed herein. It is contemplated that the visual feedback 104 provided in this manner may help improve user friendliness and usability of the control panel 100. More specifically, the control elements 102 (e.g., the control keys and the control knobs) located on the control panel 100 may be equipped with sensors configured to detect near-touches of the control elements 102. In some embodiments, the sensors may be implemented as simple capacitive sensing pads incorporated into the surfaces of (or around) the control elements 102. As the user moves his/her fingers (or other types of input devices such as styluses or the like) towards a particular control element 102 of the control panel 100 (the "Q" key in this example), the sensor incorporated into the surface of that particular control element 102 may be able to detect the presence of the finger and generate a detection signal accordingly. The detection signal may be communicated to one or more processors (not shown in FIG. 1), which may process the detection signal and prompt a display 110 (e.g., a head up display, a flight display, or a head mounted display) to present the visual feedback 104 to the user.

Figure 2:
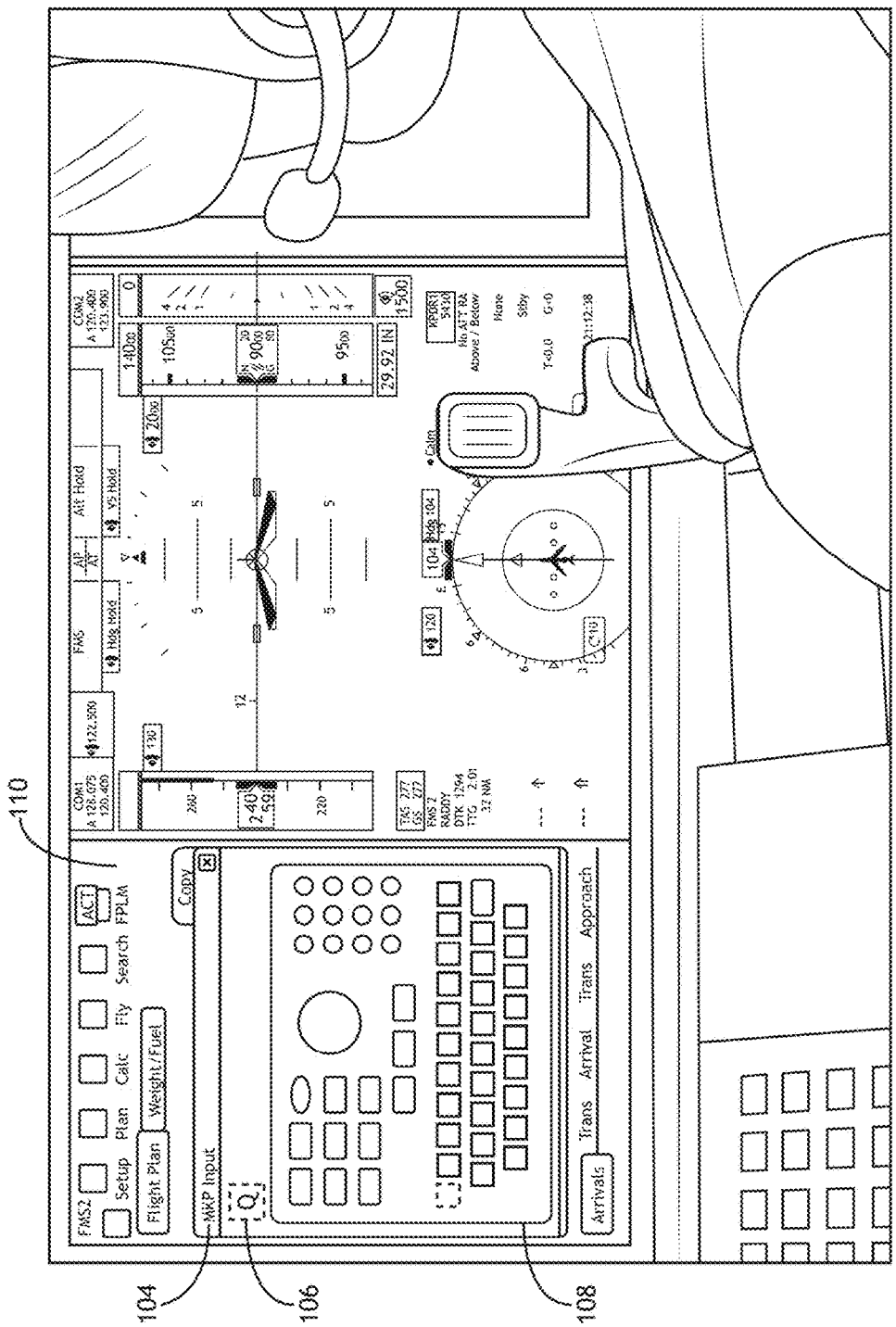
FIG. 2 is an illustration depicting an exemplary display configured to support an exemplary visual feedback configured according to an exemplary embodiment of the inventive concepts disclosed herein.

The visual feedback 104 may provide an indication to the user as to which control element 102 the user's finger is about to touch. The indication may also be provided when the user is actually touching a control element 102. For instance, the user may touch a control element 102 before initiating a control (e.g., the user may touch a button/switch before pressing or activating the button/switch; likewise, the user may touch a knob before pressing, rotating, or activating the knob). For purposes of clarity and simplicity, the term "near-touch" is used to reference situations where the user's finger is about to touch the control element 102 and where the user's finger is actually touching the control element 102. For both types of near-touches, as shown in FIG. 2, the visual feedback 104 provided may include a textual representation 106 (e.g., key "Q") of the control element 102 the user's finger is nearly touching. Additionally and/or alternatively, the visual feedback 104 may include a graphical representation 108 of the control element 102 the user's figure is nearly (or actually) touching. It is to be understood that the graphical representation 108 may be of various forms. In some embodiments, the graphical representation 108 may include a simplified graphical layout of the control panel 100 and highlight of the particular control element 102 the user's finger is nearly touching. It is contemplated that other types of graphical representations may also be utilized without departing from the broad scope of the inventive concepts disclosed herein. It is also contemplated that the visual feedback 104 may disappear once the user moves his/her finger away from the control panel 100.

Figure 3:
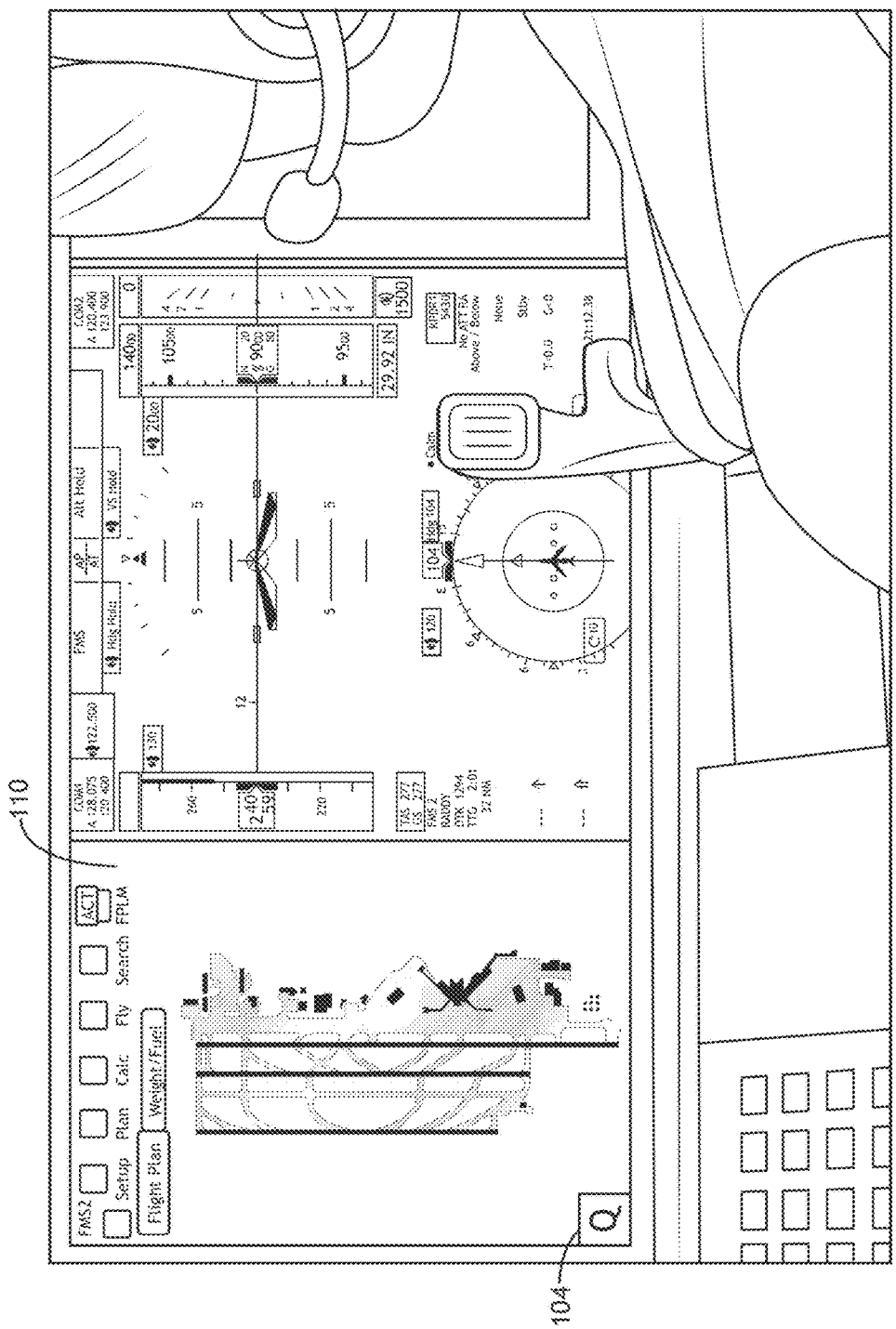
FIG. 3 is an illustration depicting an exemplary display configured to support another exemplary visual feedback configured according to an exemplary embodiment of the inventive concepts disclosed herein.
Figure 4:
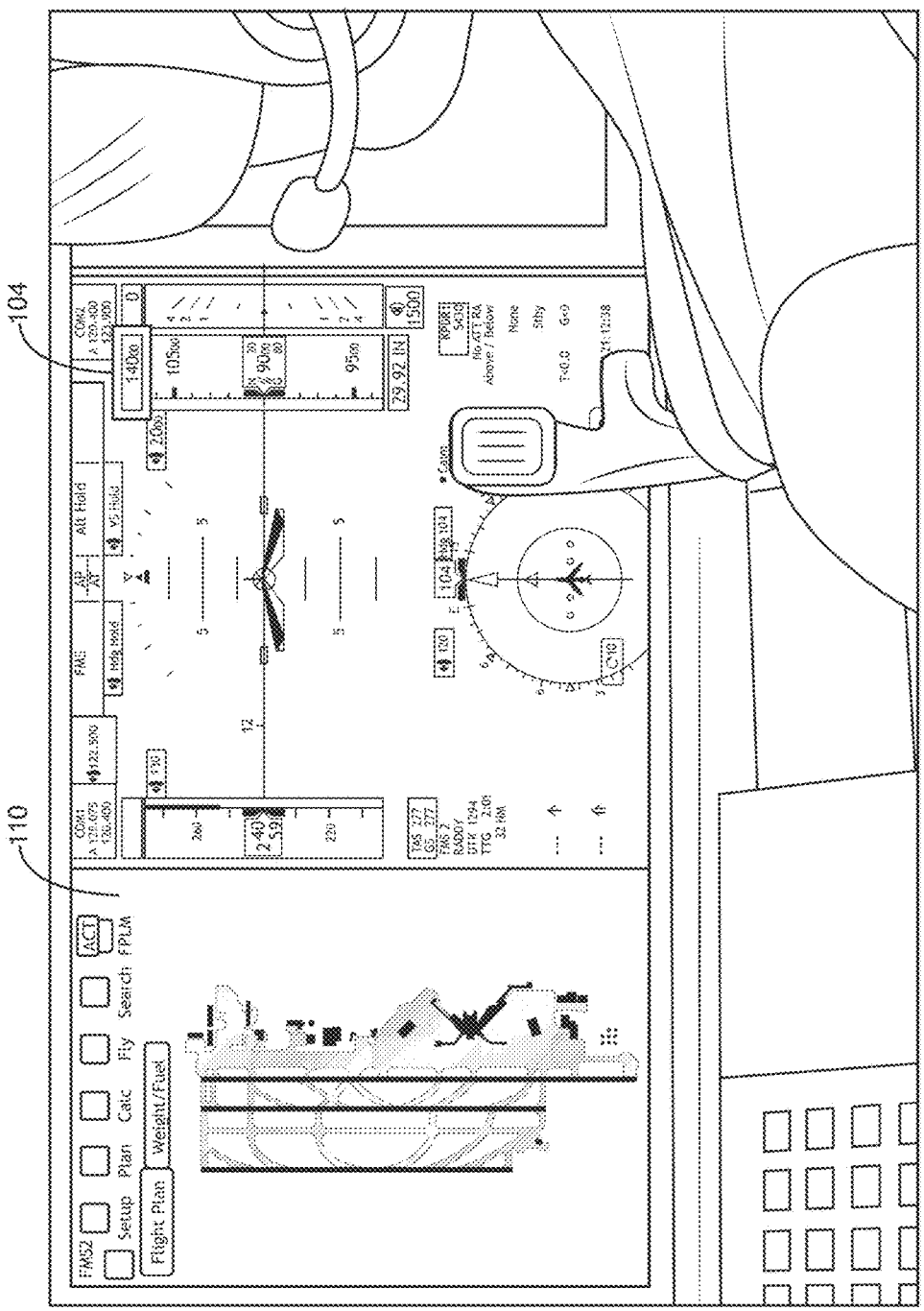
FIG. 4 is an illustration depicting an exemplary display configured to support another exemplary visual feedback configured according to an exemplary embodiment of the inventive concepts disclosed herein.

It is further contemplated that the visual feedback 104 may be displayed at a location that is out of the way of other display features (as opposed to a pop-up box that may interfere with other display features). For example, as shown in FIG. 3, it may be beneficial in some situations to configure the visual feedback 104 as a single line element at a corner (or the bottom) of the display 110. Alternatively, as shown in FIG. 4, if the user is using the control element 102 (e.g., an altitude knob) to set a particular parameter (e.g., the altitude), it may be beneficial to configure the visual feedback 104 so that the visual feedback 104 can be provided at the location where the particular parameter is normally displayed (e.g., the location where altitude is displayed on the primary flight display may be highlighted). In another example, if the user is using the control element 102 to insert data into a text field, the visual feedback 104 may be provided in line with the text (e.g., text already entered may be shown in a solid color while a preview letter in a lighter color can be shown where the cursor is in response to near touches to specific control elements). It is to be understood that the various types of visual feedbacks 104 described above are merely exemplary and are not meant to be limiting. It is contemplated that visual feedbacks 104 may be configured in other manners not specifically described above without departing from the broad scope of the inventive concepts disclosed herein.

Figure 5:
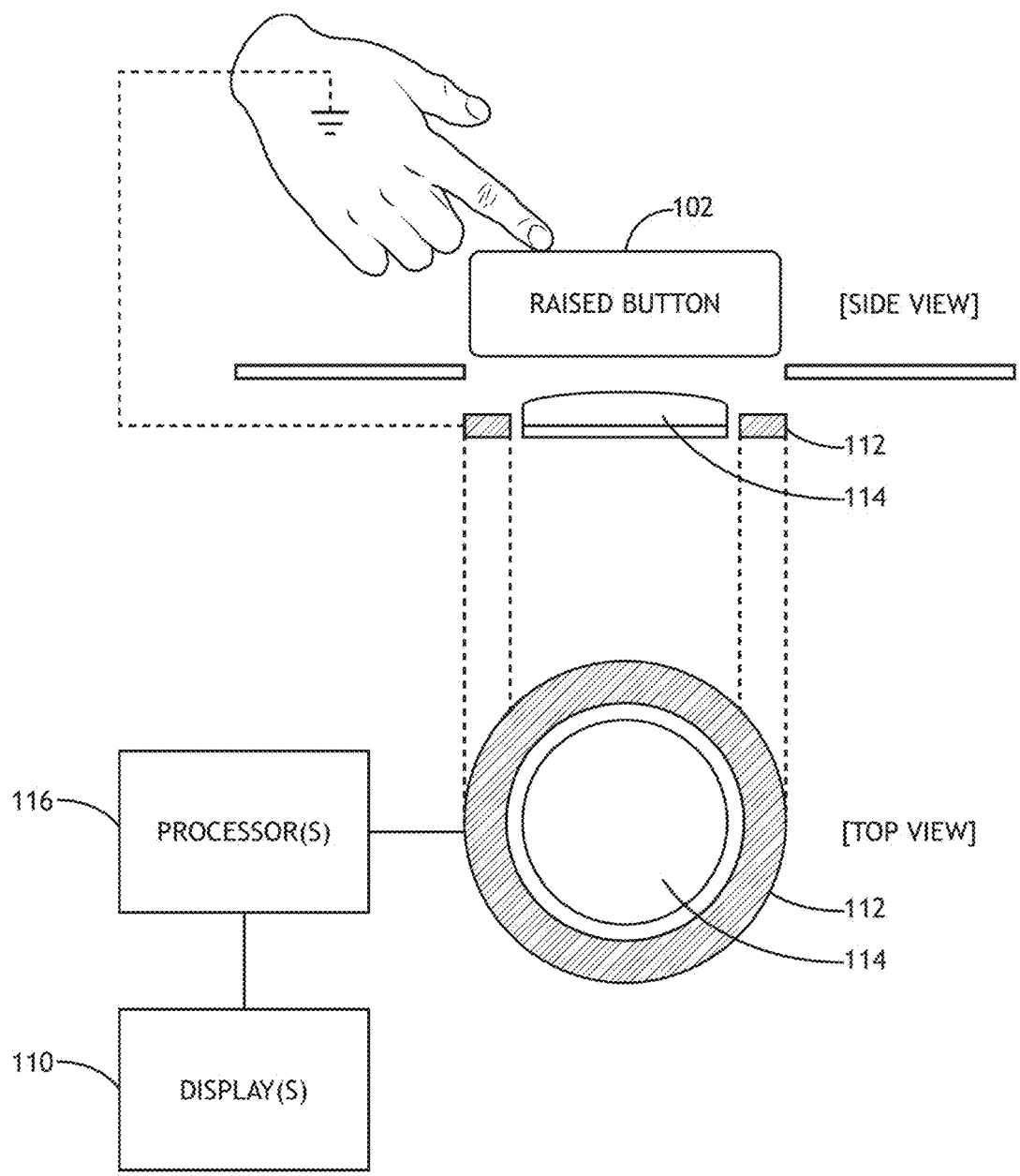
FIG. 5 is a block diagram depicting an exemplary sensing device configured to detect near-touches of a control element located on an exemplary control panel configured according to an exemplary embodiment of the inventive concepts disclosed herein.
Figure 6:
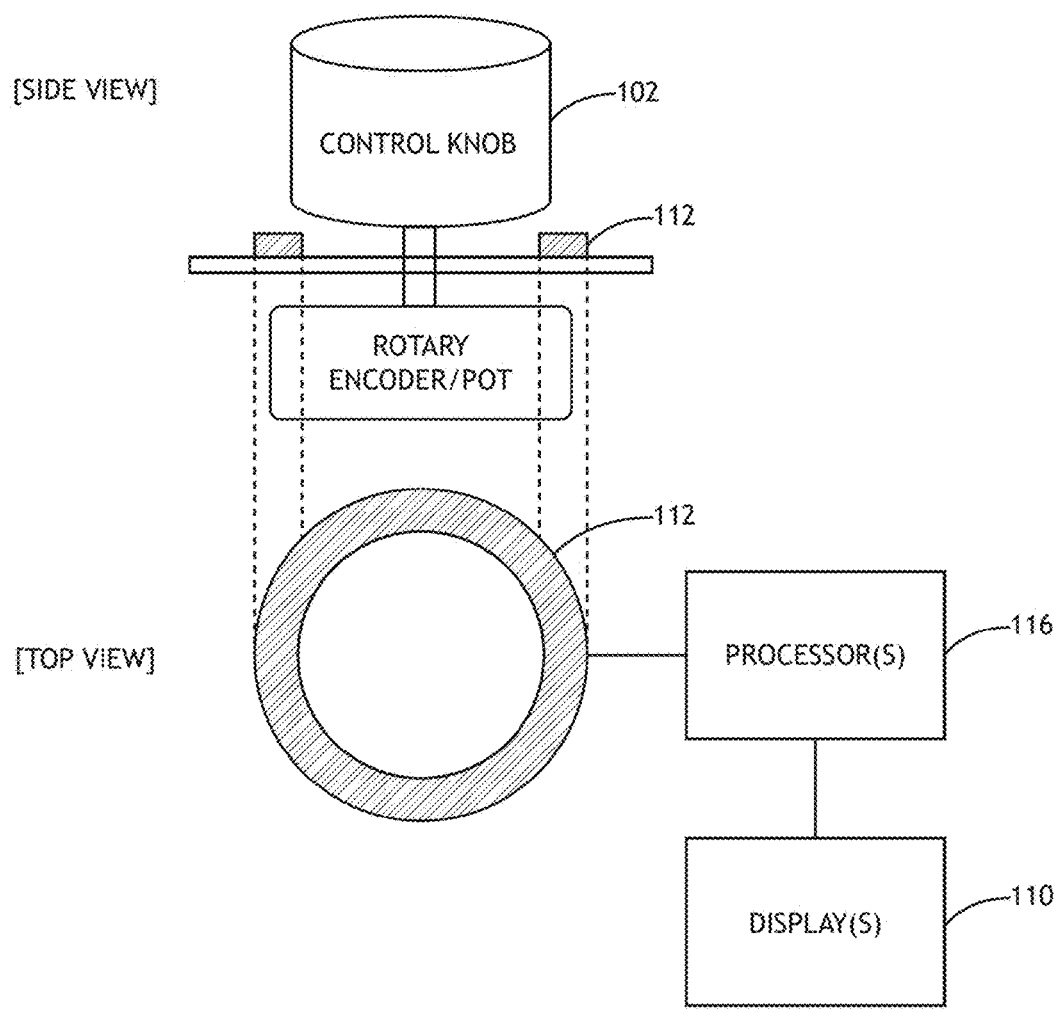
FIG. 6 is a block diagram depicting an exemplary sensing device configured to detect near-touches of another control element located on an exemplary control panel configured according to an exemplary embodiment of the inventive concepts disclosed herein.

Referring now to FIGS. 5 and 6, simplified block diagrams depicting exemplary sensors 112 configured to detect near-touches of control elements 102 located on an exemplary control panel 100 configured in accordance with an embodiment of the inventive concepts disclosed herein are shown. More specifically, as depicted in FIG. 5, a capacitive sensing pad 112 may be placed (e.g., printed circuit board mounted) around the membrane switch 114 of a control element 102 implemented in the form of a button. Similarly, as depicted in FIG. 6, a capacitive sensing pad 112 may be placed (e.g., mounted) around the outside of a control element 102 implemented in the form of a rotary knob/button. As the user moves his/her finger towards a control element 102 configured in such a manner, the capacitive sensing pad 112 associated with that control element 102 may be able to sense the presence of the finger and generate a detection signal accordingly.

It is to be understood that the references to buttons and/or knobs are merely exemplary and are not meant to be limiting. It is contemplated that capacitive sensing pads 112 may be placed around various other types of control elements (e.g., switches, control sticks, or trackballs) without departing from the broad scope of the inventive concepts disclosed herein.

It is also to be understood that the references to capacitive sensing pads are merely exemplary and are not meant to be limiting. It is contemplated that sensors may be implemented using various other types of sensing technologies without departing from the broad scope of the inventive concepts disclosed herein. For instance, in some embodiments, optical sensors may be utilized instead of (or in addition to) capacitive sensors to help detect presence of fingers.

Further, it is to be understood that not every control element 102 located on a control panel 100 is required to be associated with a sensor 112. It is contemplated that which control elements 102 are to be associated with sensors 112 may be determined based on cost, size, complexity, location of the control panel 100, as well as various other factors without departing from the broad scope of the inventive concepts disclosed herein. It is also contemplated that some (or all) of the sensors 112 may be positioned around the bezel areas of the control panel 100 (instead of being associated with individual control elements 102). Sensors 112 configured in this manner may utilize techniques such as triangulation and the like to determine the location of the user's finger.

The sensors 112 may be configured to communicate with one or more processors 116, which may be configured to communicate with one or more display(s) 110. The processor(s) 116 may be implemented as one or more embedded controllers of the display(s) 110. Alternatively and/or additionally, the processor(s) 116 may be implemented as dedicated processing units, application-specific integrated circuits (ASICs), field-programmable gate arrays (FPGAs), or various other types of processors or processing units. The processor(s) 116 may be configured to process the detection signal, identify the appropriate control element 102 based on the detected location, and prompt the display 110 to present a visual feedback 104 to the user as previously described.

It is to be understood that control panels configured in accordance with embodiments of the inventive concepts disclosed herein are not limited to mechanical control panels. It is contemplated that the control panel 100 may, for example, include a touch screen control element (as opposed to a mechanical control element), in which case the touch screen control element may include a first set of sensors (e.g., one or more capacitive sensors) configured to determine the location of the user's finger within the touch screen area and help present a visual feedback 104 to the user. The touch screen control may also include a second set of sensors (e.g., one or more resistive sensors) configured to determine the location of a push, which may then be utilized to activate a certain function selected by the user.

It is also contemplated that the visual feedback 104 may be disabled (e.g., to prevent a malfunction in the detection component from interfering/covering critical or otherwise needed elements) by the processor(s) 116 or by a physical switch (not shown). In some embodiments, the processor(s) 116 may be configured to automatically detect conditions and determine whether the visual feedback 104 should be disabled. For instance, a pilot flying an aircraft may generally not be using a keyboard input while flying an approach or other critical flight phases, and it may be beneficial to disable visual feedback for that pilot. On the other hand, a co-pilot not flying the aircraft may be working on administrative tasks that may require some data entry, and it may therefore be beneficial to enable visual feedback for that co-pilot. It is to be understood that the conditions for enabling/disabling the visual feedbacks described above are merely exemplary and are not meant to be limiting. It is contemplated that the processor(s) 116 may be configured to support other types of conditions without departing from the broad scope of the inventive concepts disclosed herein.

Figure 7:
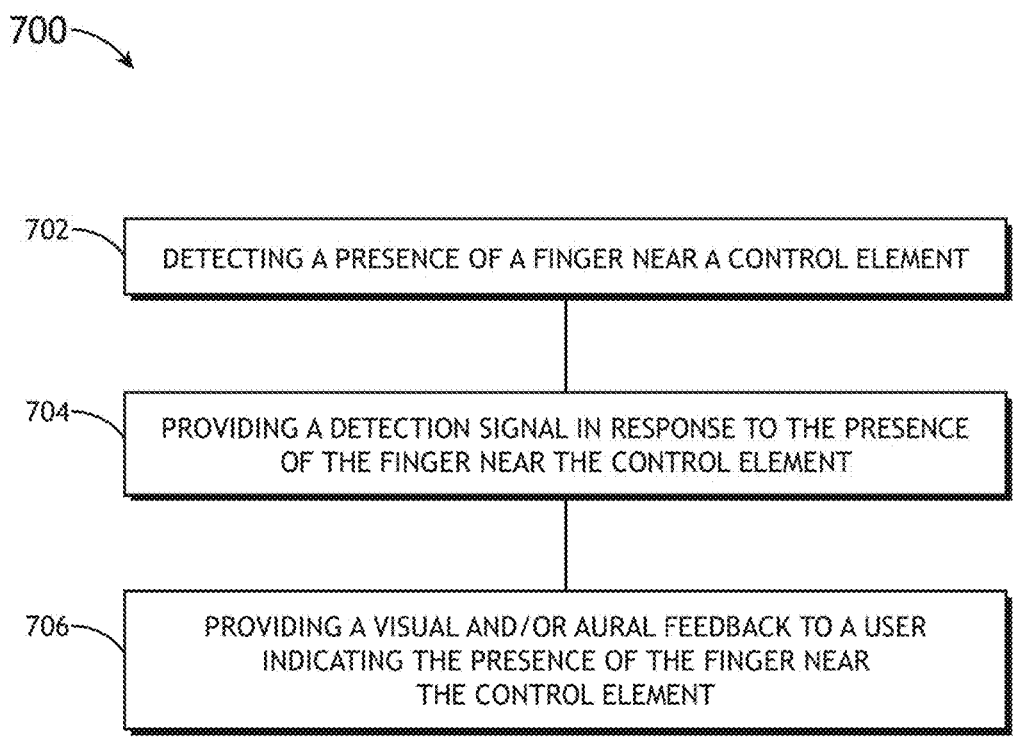
FIG. 7 is a flow diagram depicting an exemplary user interface method for an exemplary control panel configured according to an exemplary embodiment of the inventive concepts disclosed herein.

Referring now to FIG. 7, a flow diagram depicting an exemplary user interface method 700 configured in accordance with an embodiment of the inventive concepts disclosed herein is shown. As illustrative in FIG. 7, the presence of a finger (or other types of input devices such as styluses or the like) near a control element may be detected in a step 702. In some embodiments, the presence of the finger may be detected using a sensing pad mounted around the control element. It is contemplated that other types of sensors may be utilized without departing from the broad scope of the inventive concepts disclosed herein.

A detection signal may be generated in a step 704 upon a detection of a presence of a finger near a control element. The detection signal may be provided to one or more processors, which may then provide a feedback to a user to indicate the presence of the finger near the control element in a step 706. The feedback may be in the form of a visual feedback presented on a display. Additionally and/or alternatively, the feedback may be in the form of an aural feedback provided through a speaker.

As will be appreciated from the above, control panels and user interface methods configured in accordance with embodiments of the inventive concepts disclosed herein may be able to provide aural and/or visual feedback of finger positions to help improve user friendliness and usability. Further, it is noted that while other control systems may provide post-input feedback (confirmation of entry or a display of text), control panels configured in accordance with embodiments of the inventive concepts disclosed herein may be able to provide visual feedback prior to the selection, allowing for confident control entry before making a mistake in the first place. Additionally and/or alternatively, an aural feedback containing similar information may also be provided to further assist users. It is to be understood that the references made to avionics and aircraft applications are merely exemplary and are not meant to be limiting. It is contemplated that control panels and user interface methods configured in accordance with embodiments of the inventive concepts disclosed herein may be utilized in various types of applications and operating environment without departing from the broad scope of the inventive concepts disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. An apparatus, comprising:
at least two control elements, the at least two control elements including a key and a knob;
a capacitive sensor associated with each control element of the at least two control elements, the capacitive sensor located at least partially above an exterior surface around each control element of the at least two control elements, configured to detect a presence of a finger near one of the at least two control elements and generate a detection signal, the capacitive sensor formed as a ring and configured to surround each control element of the at least two control elements; and
one or more processors in communication with the capacitive sensor, the one or more processors configured to process the detection signal and provide a feedback indicating the presence of the finger near the one of the at least two control elements to a user.

2. The apparatus of claim 1, further comprising: a display in communication with the one or more processors, the display configured to provide a visual feedback indicating the presence of the finger near the one of the at least two control elements to the user.

3. The apparatus of claim 2, wherein the display is a head up display or a head mounted display.

4. The apparatus of claim 1, further comprising: a speaker in communication with the one or more processors, the speaker configured to provide an aural feedback indicating the presence of the finger near the one of the at least two control elements to the user.

5. A method, executable by a sensor and one or more processors in communication with the sensor, comprising:
detecting a presence of a finger near one of at least two control elements by positioning the sensor which is formed as a ring to surround the at least two control elements, the at least two control elements including a key and a knob, the sensor located at least partially above an exterior surface around each control element of the at least two control elements;
providing a detection signal to one or more processors in response to the presence of the finger near the one of the at least two control elements; and
providing a feedback to a user, facilitated by the one or more processors, to indicate the presence of the finger near the one of the at least two control elements, the sensor including a capacitive sensor.

6. The method of claim 5, wherein the providing a feedback to a user further comprises: providing a visual feedback to indicate the presence of the finger near the one of the at least two control elements to the user.

7. The method of claim 6, wherein the visual feedback is provided utilizing a head up display or a head mounted display.

8. The method of claim 5, wherein the providing a feedback to a user further comprises: providing an aural feedback to indicate the presence of the finger near the one of the at least two control elements to the user.

9. The method of claim 5, wherein the at least two control elements are located in a cockpit of an aircraft.

10. An apparatus, comprising:
at least two control elements, the at least two control elements including a key and a knob;
an optical sensor associated with each control element of the at least two control elements, the optical sensor located at least partially above an exterior surface around each control element of the at least two control elements, configured to detect a presence of a finger near one of the at least two control elements and generate a detection signal, the optical sensor formed as a ring and configured to surround each control element of the at least two control elements; and
one or more processors in communication with the optical sensor, the one or more processors configured to process the detection signal and provide a feedback indicating the presence of the finger near the one of the at least two control elements to a user.

11. The apparatus of claim 10, further comprising: a display in communication with the one or more processors, the display configured to provide a visual feedback indicating the presence of the finger near the one of the at least two control elements to the user.

12. The apparatus of claim 11, wherein the display is a head up display or a head mounted display.

13. The apparatus of claim 10, further comprising: a speaker in communication with the one or more processors, the speaker configured to provide an aural feedback indicating the presence of the finger near the one of the at least two control elements to the user.

* * * * *